May 14, 1940. J. RATEAU 2,200,431
COMBINED MAGNETIC COMPASS AND DIRECTIONAL GYROSCOPE
Filed May 19, 1937 4 Sheets-Sheet 1

INVENTOR.
Jacques Rateau
BY
Young, Emery & Thompson
ATTORNEYS

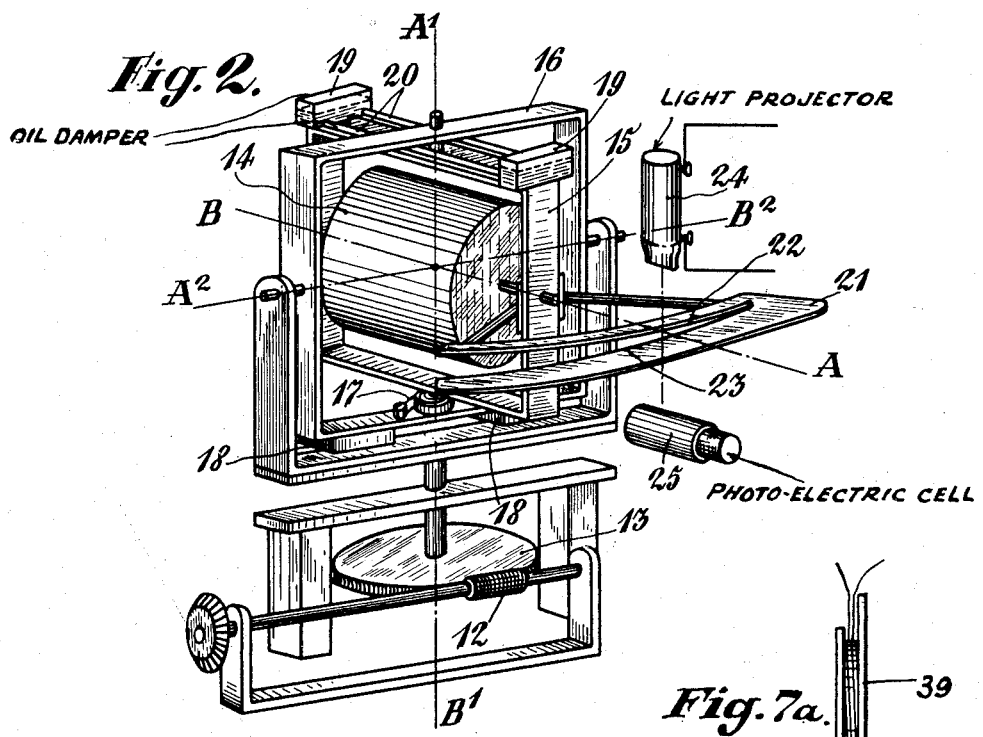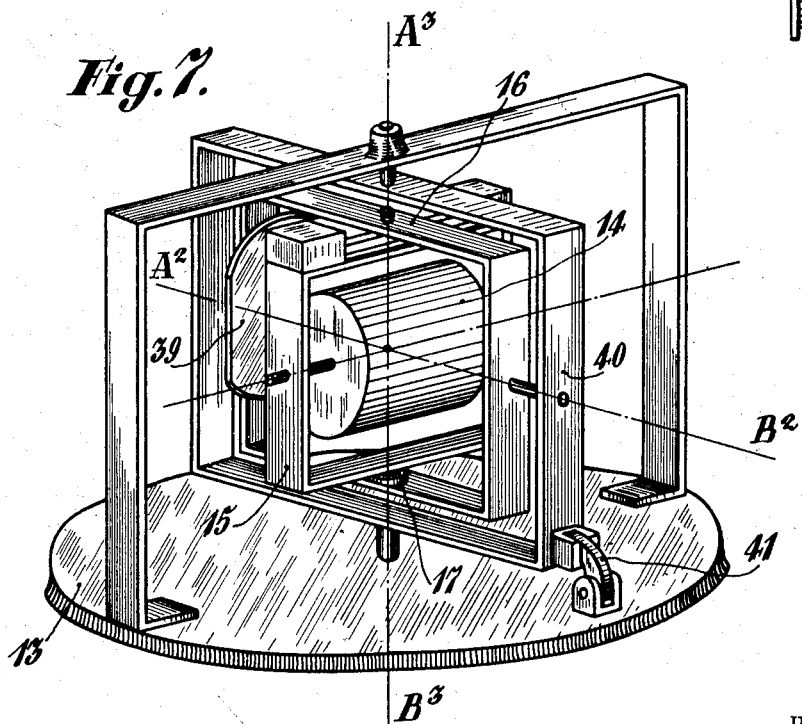

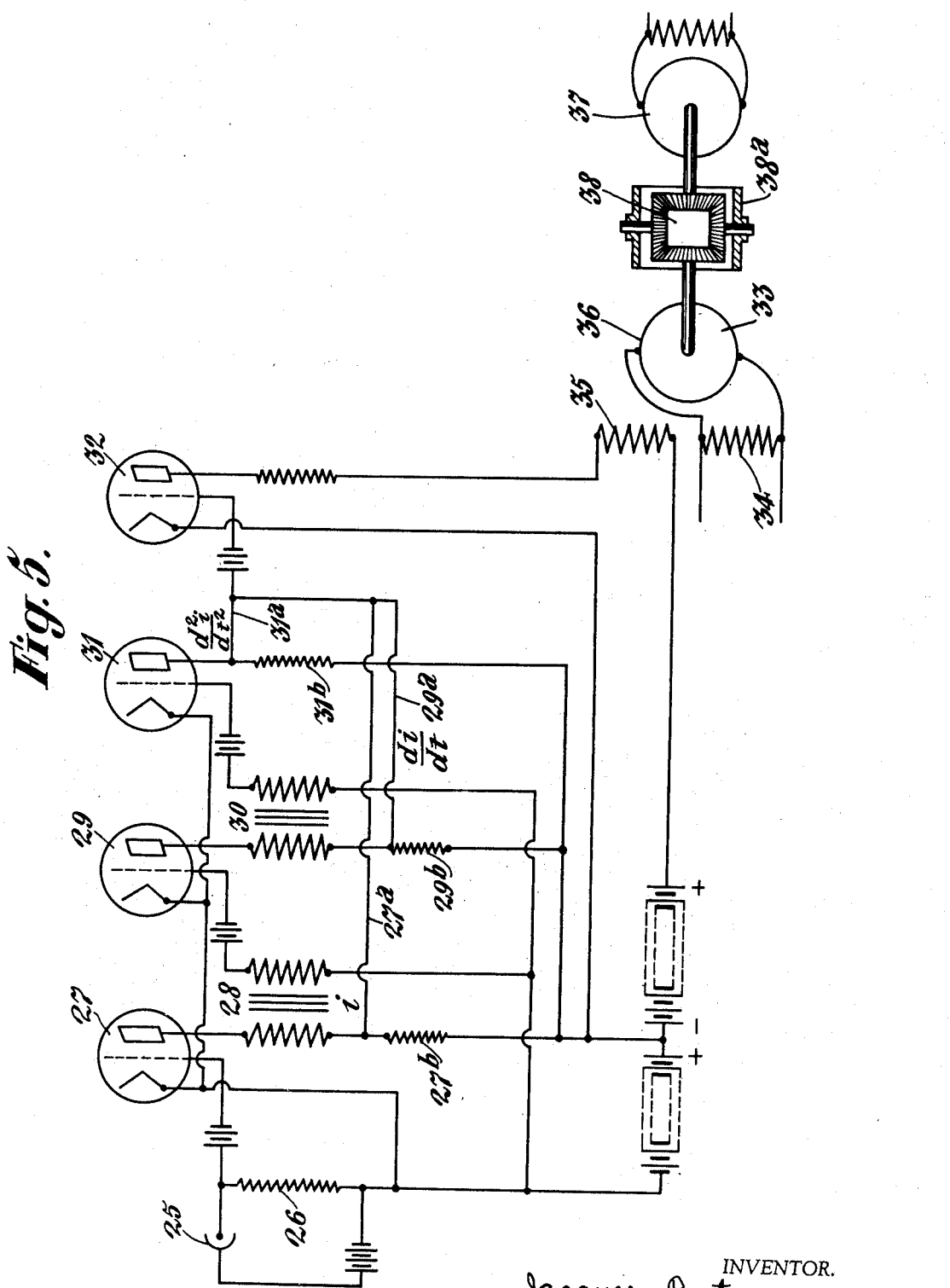

Patented May 14, 1940

2,200,431

UNITED STATES PATENT OFFICE 2,200,431

COMBINED MAGNETIC COMPASS AND DIRECTIONAL GYROSCOPE

Jacques Rateau, Montrouge, France

Application May 19, 1937, Serial No. 143,607
In France May 26, 1936

5 Claims. (Cl. 33—204)

It is known that a magnetic compass is subject to oscillations due to the disturbances to which the vehicle carrying it is exposed. The direction followed by the vehicle is, at any moment, the mean of the indications of the dial.

On the other hand, if the axle of a gyroscope of three degrees of freedom retains a fixed direction during a certain time and makes it possible theoretically to determine the variations of course, the indications of the gyroscope are upset in practice by the precessions which are due to friction and other undetermined and irregular causes.

The invention has for its object to provide a magnetic and gyroscopic compass in combination, which enables the obviation of the defect inherent in magnetic compasses and in gyroscopes employed independently of one another. The characteristic feature of this compass is that the dial is rendered subservient to the gyroscope in such a manner that at each deflection of the dial the axle of the gyroscope or the inner ring of the universal joint carrying this axle (the ring pivoted around a vertical axis) shall be subject to a couple proportional to said deflection.

Moreover, by the attachment of conveniently eccentric masses to the exterior frame of the universal mounting of the gyroscope (the frame pivoted around a horiontal axis), a pendulum moment is imparted to the gyroscopic assembly around said axis, and the oscillations of said assembly are powerfully braked by an appropriate damper, in such manner that their period shall be great relatively to the period of oscillation of the dial.

If the dial performs a series of oscillations in one direction and the other from its normal position, the axle of the gyroscope is subjected to alternate couples, the mean of which is zero. The gyroscope tends to perform precessions around the horizontal axis of the universal mounting, but these very slow and alternate precessions have no time for becoming rough. In fact, the axle of the gyroscope remains parallel to a fixed direction, for example to the magnetic north, and consequently permits the direction to be ascertained at any moment. It is sufficient to fix to the axle of the gyroscope or the inner ring of the universal mounting a needle moving opposite a scale carried by the body in motion.

For obtaining automatic piloting with the aid of this device means acting upon the controls in accordance with the directional angle indicated by the gyroscope are associated therewith.

These means are preferably such that $\theta$ being the directional angle and $r$ the action to which the controls are subjected, for example the angular displacement thereof, these two quantities shall be interlinked by a differential equation of the form:

$$a\frac{d^2\theta}{dt^2} + b\frac{d\theta}{dt} + c\theta = d.r' + e.r''$$

In this equation, the terms are as follows:

$a$ = moment of inertia,
$b$ = dampening,
$c$ = rudder couple coefficient,
$d$ and $e$ = rudder coefficients,
$r'$ and $r''$ = action on rudders.

The convenient choice of coefficients enable damping of the oscillations of the body in motion around the imposed direction, it being possible to make the coefficient $e$ equal zero.

In one embodiment of such a device an electric current is generated, the intensity $i$ of which is proportional to the directional angle. For example, a screen is attached to the axle of the gyroscope, having a slot the width of which varies in proportion to the directional angle and through which a pencil of light generated by a source fixed to the body in motion reaches a photo-electric cell also fixed to the body in motion.

For producing currents representing the successive derivatives of the current $i$, as a function of time, there are provided, according to the invention, for each derivative, two three electrode valves, the first of which receives on its grid a tension proportional to the current to be derived, its plate circuit being connected to the primary of an iron transformer, the secondary of which is connected to the grid of the second valve. The current resulting from the addition of the currents thus obtained, which are respectively proportional to $$\theta\frac{d\theta}{dt} \text{ and } \frac{d^2\theta}{dt^2}$$

acts upon a motor in such a manner as to modify its speed according to a linear law. This motor may be mechanically coupled to a motor of constant speed through a differential, the cage of which is connected to the controls.

The following description, in which reference is had to the accompanying drawings, given by way of example, will make it quite clear in what manner the invention is to be carried into effect.

Fig. 2 is a perspective view of the gyroscope and its frame, associated with a device whereby a current proportional to the directional angle may be generated.

Fig. 5 is a diagrammatic view of a valve arrangement, making it possible to obtain derivatives of the generated current and to cause their sum to act upon the controls.

Fig. 7 shows a modification of the gyroscopic mounting.

Fig. 7a is a detail view of disc 39 and its winding.

Figure 3:
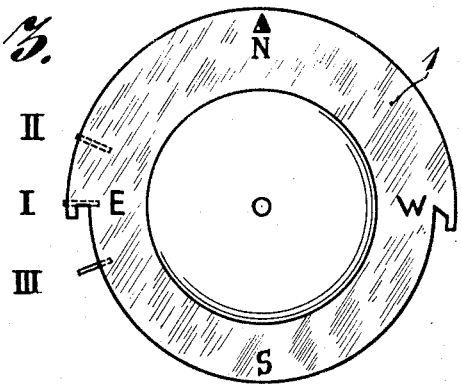
Fig. 3 is a plan view on a larger scale of the dial of the magnetic compass.
Figure 1:
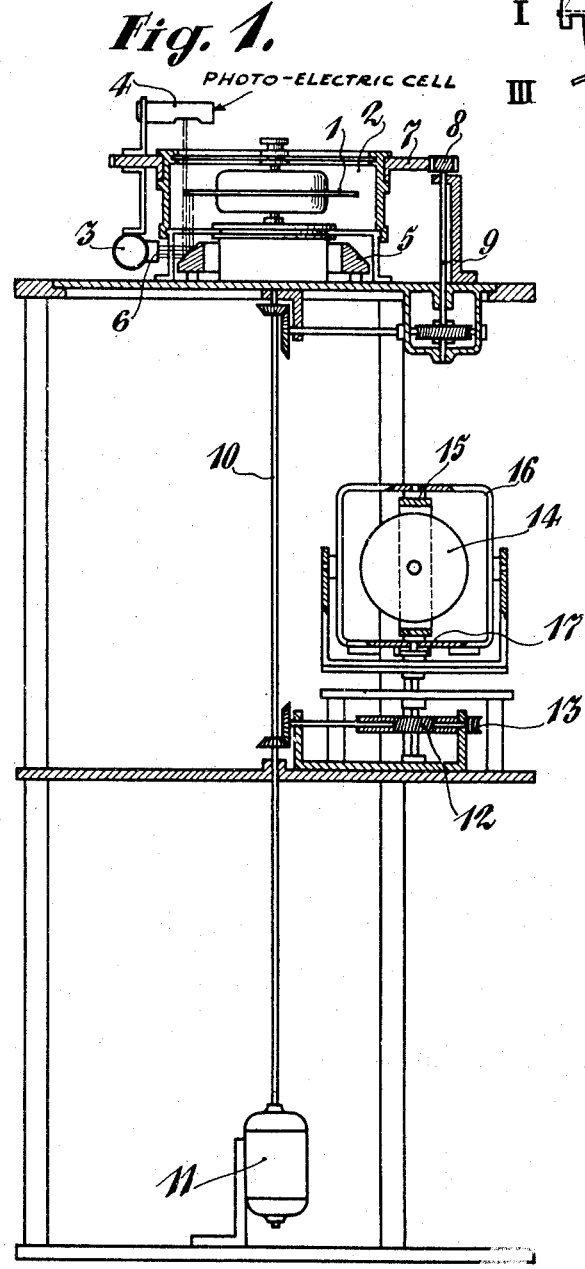
Fig. 1 shows diagrammatically, in sectional elevation, the combined compass according to the invention.

In the drawings 1 indicates the dial of the magnetic compass, which is freely movable in the interior of a box 2. On its periphery this dial forms a screen influencing the pencil of light emitted by a projector 3 and reflected towards a photo-electric cell 4 by a frusto conical mirror 5. The pencil of light issues from the projector 3 through a vertical slot 6, in such a manner that after reflection the horizontal section of the pencil of light is a small straight band located in a plane passing through the axis of rotation of the dial.

As will be seen in Fig. 3, the periphery of the dial is cut away over half of the circumference. Thus, the dial produces upon the pencil of light three different effects, according to the position which it occupies with reference to the assembly of cell and projector. In position I only part of the luminous flux arrives at the cell 4, in position II the whole of the luminous flux is arrested by the dial which is not transparent, in the position III the whole of the luminous flux impinges upon the cell. The assembly of cell and projector is fixed to a plate 7, which is rotatable around the axis of the dial with reference to the box 2. This plate 7 is provided on its periphery with teeth meshing with a pinion 8 keyed to a shaft 9. This shaft in turn is connected for rotation to the shaft 10 of a small electric motor 11. The current passed by the photo-electric cell 4 is amplified by a valve arrangement, not shown, and then acts on relays controlling the electric motor 11 which is rotatable in both directions. When the pencil of light is in the position I with reference to the dial the motor is stopped, but in all other positions the motor 11 determines the rotation of the plate 7 and of the assembly of cell and projector in a direction such that the pencil of light shall be returned into the position I, which is the position of equilibrium. Thus, the assembly of projector and cell always turns through an angle equal to the angle of each displacement of the dial, in such a manner as to retain a fixed position with reference to the dial.

Figure 4:
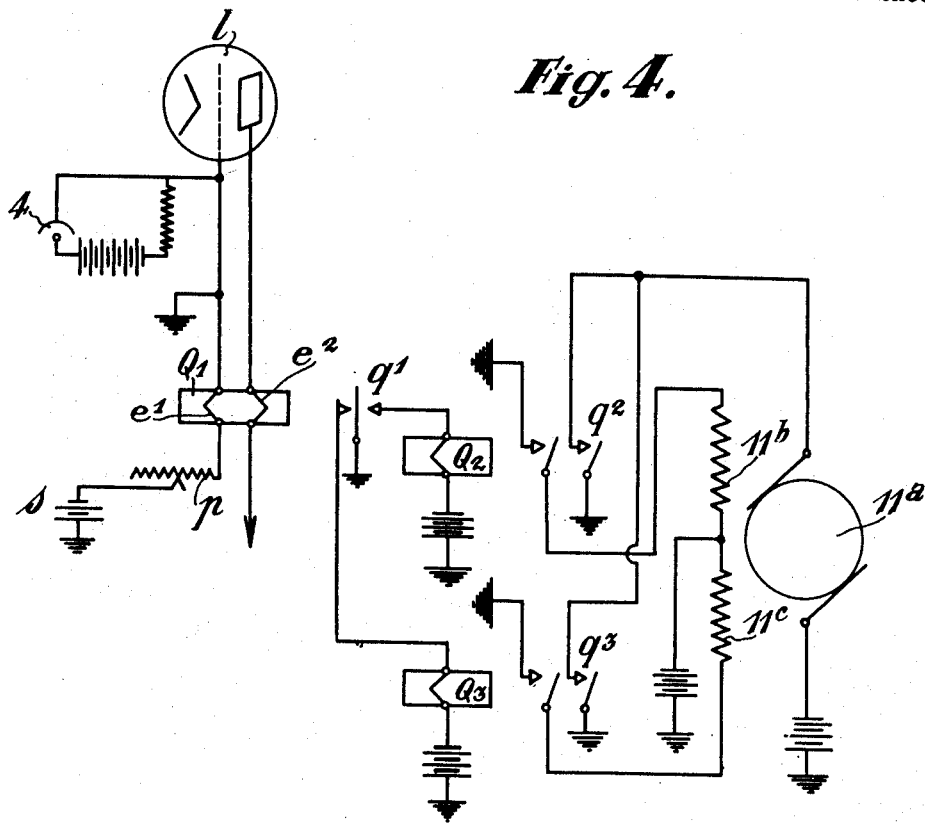
Fig. 4 shows diagramatically the relays connected to the photo-electric cell associated with the dial.

The relays controlling the motor 11 may be arranged as shown in Fig. 4. The motor 11, the armature of which is indicated at 11ª, has two field windings 11ᵇ and 11ᶜ. According to whether neither of these windings is excited or one of them is excited, the motor 11 is stopped or rotates in one direction or the other. A relay $Q^1$ has two windings $e^1$, $e^2$ wound in opposite directions. When the currents passing through these windings are equal, the armature $q^1$ of the relay $Q^1$ is at rest, neither of the relays $Q^2$, $Q^3$ is excited and the motor 11 is stopped. On the contrary, when one of the currents passing through $e^1$ or $e^2$ predominates, one of the relays $Q^2$ or $Q^3$ is excited and the motor 11 is started up in one direction or the other. One of the windings $e^1$ is connected to the grid and the other to the plate circuit of a thermionic valve $l$. To the winding $e^1$ is furthermore connected a source $s$ with control resistance $p$. The circuit of the cell 4 is connected to the grid of the valve $l$, in such a manner that the tension thus supplied to the grid shall be proportional to the current supplied by the cell.

For convenience of regulation the currents passing through $e^1$ and $e^2$ will balance one another in the position I of the dial, while one or the other of these currents will predominate in the positions II and III of the dial.

The motor 11 also drives through a worm 12 a worm wheel 13 which supports a gyroscope 14 driven, for example, electrically. The rotations of this wheel 13 are therefore equal to the rotations of the dial and the wheel operates as a repeater of the displacements of the dial.

The gyroscope is supported by this wheel through the universal mounting rings 15 and 16, which are respectively rotatable around the axes $A^1$—$B^1$, $A^2$—$B^2$ (Fig. 2), these being perpendicular with reference to one another. In principle the axis $A^1$—$B^1$ is intended to be vertical and the axis $A^2$—$B^2$ to be horizontal. A torsion spring 17 is interposed between the rings 15 and 16. Masses 18 are fixed to the ring 16, in such a way that the system 14, 15, 16 shall have a pendulous moment around the axis $A^2$—$B^2$. The oscillations of this system are damped by the displacement of oil contained in two tanks 19 fixed to the ring 15, on respective sides of the axis $A^1$—$B^1$, and communicating through the narrow tubes 20. The whole of the masses and damper are calculated in such a manner that the period of oscillation around $A^2$—$B^2$ shall be large relatively to the period of oscillation of the dial.

It will be seen that during the oscillations of the dial 1, which determine the corresponding oscillations of the wheel 13, the ring 15 carrying the gyroscope is subjected, owing to the provision of the spring 17, to alternate couples, which tend to produce precessions periodically inversed, by pivotal action around the axis $A^2$—$B^2$. These precessions being very slow, they have no time to develop between two oscillations of the dial, and the axis A—B of the gyroscope preserves a fixed direction giving the directional angle.

For repeating this angle at a distance the device shown in Fig. 2 may be adopted.

A horizontal screen 21, fixed to the ring 15, carries a slot bounded on one side by a circular arc 22 having is centre on the axis $A^1$—$B^1$ and on the other side by a portion of an Archimedean spiral 23, also having its pole on said axis. A projector 24 fixed to the body in motion projects upon this slot a pencil of light which is very flat and the horizontal section of which, when extended, is substantially a straight line passing through the axis $A^1$—$B^1$. The luminous flux passing through this slot is therefore proportional to the directional angle θ. It is received by a photo-electric cell 25 which generates a current $i$ also proportional to this angle.

For the automatic piloting, currents $i$ are caused to act upon the controls in such a manner that the action $r$ upon these controls shall be a function of θ. This has the defect that parasite beats are produced, $\theta$ oscillating to one side and the other of the value which it is desired to have, and further that errors are introduced due to any systematic disturbing causes. Finally, such a manner of subjection does not offer any flexibility in the case of violent atmospheric disturbances.

According to the invention, the subordination obeys a differential equation of the form $$a\frac{d^2\theta}{dt^2} + b\frac{d\theta}{dt} + c\theta = d.r' + e.r''$$

wherein $a$, $b$, $c$, $e$ are constants. Thus a relation may be obtained between $r$ and $\theta$ damped as much as may be desired, so that if the body in motion is deflected from the assigned directional angle it returns to same without performing parasitic oscillations. Moreover, owing to the absence of $r$ from the equation of subordination the errors of direction are integrated and consequently corrected by the device, which renders systematic errors impossible. Finally, by the convenient choice of the coefficients $a$, $b$, $c$, $d$ sufficient flexibility may be obtained in the case of violent disturbances.

First an embodiment will be described wherein $e = 0$.

From the current $i$ currents proportional to the derivatives $$\frac{di}{dt} \text{ and } \frac{d^2i}{dt^2}$$

are generated, the coefficients of proportionality being calculated so as to introduce the factors $c$, $b$, $a$; the three currents are then added up and in this manner a resultant current is obtained, which represents the first member of the equation of subordination. Let this current be I, then $I = d.r'$. The action $r$ upon the controls is then given by $$r = k \int I \, dt$$

An embodiment is shown in Fig. 5. The cell 25 feeds a resistance 26 in such a manner that the tension at the terminals of this resistance is proportional to $i$, i. e., to $\theta$. This tension is applied to the grid of a three electrode valve 27, which this supplies in its plate circuit a current proportional to $\theta$ (the valve 27 operates in the linear part of its characteristic), this current flows through the primary of an iron transformer 28, the magnetic circuit of which includes a very large air gap, so that the reluctance R of this circuit is constant and equal to the reluctance of the air gap.

$\varphi$ being the flux, the tension $e$ at the terminals of the secondary is therefore, at open circuit, $$e = -\frac{d\varphi}{dt}$$

Now, if $n$ indicates the number of turns of the secondary, we have: 1.25 $ni = R\varphi$, i. e., $\varphi = ki$ and $$e = k\frac{di}{dt}$$

With open circuit the tension at the terminals of the secondary of this transformer is therefore proportional to the derivative of current which flows through the primary. This tension is applied to the grid of a valve 29, the polarization of which is maintained negative (grid load zero). In the plate circuit of this valve a current $$i^1 = k^1 \frac{di}{dt}$$

is obtained.

A current proportional to the second derivative is obtained in the same manner with the aid of the transformer 30 and the valve 31. Three tensions proportional to $i$, $$\frac{di}{dt} \text{ and } \frac{d^2i}{dt^2}$$

are finally supplied to the grid of the exit valve 32 by the conductors 27ª, 29ª and 31ª and finally in the plate circuit of this valve the current I required is obtained. Conveniently calculated resistances 27ᵇ, 29ᵇ, 31ᵇ enable the coefficients $a$, $b$, $c$, to be introduced.

A motor 33 has two field magnets 34, 35. The magnet 34 is connected to a suitable source and is shunted across the armature 36, while the second magnet 35 receives the current I coming from the valve 32. In this manner the speed of the motor is proportional to I. This motor is connected to a second motor 37 of a single field magnet and rotating at a constant speed, with the aid of a differential 38. For a current I corresponding to the correct direction the two motors rotate at the same speed and the cage 38ª of the differential remains stationary. If the luminous flux varies, the current I is modified and the speed of the motor 33 varies. The cage of the differential then rotates at a speed proportional to the difference of the speeds of the two motors, i. e., to I. The angle of rotation of the cage is finally proportional to $\int I \, dt$ and therefore it is sufficient to connect this cage to the controls for obtaining the desired subordination.

A modification will now be described, wherein $e \neq 0$, so that the differential equation of subordination is as follows:

$$a\frac{d^2\theta}{dt^2} + \frac{bd\theta}{dt} + c\theta = dr' + er''$$

(by this subordination greater flexibility is obtained).

The first member of the equation is resolved as previously, currents proportional to $\theta$ and its derivatives are formed, then the sum is obtained and a current I results (1) $$I = a\frac{d^2\theta}{dt^2} + \frac{bd\theta}{dt} + c\theta = dr' + er''$$

This current flows in a circuit including a choke (resistance R, choke L) in parallel with a resistance R¹.

The current I is divided into two currents $i^1$ and $i^2$, so that:

$$I = i^1 + i^2$$

$$R^1 i^1 = R i^2 + L\frac{di^2}{dt}$$

$$R^1(I - i^2) = R i^2 + L\frac{di^2}{dt}$$

$$R^1 I = i^2(R + R^1) + L\frac{di^2}{dt}$$

$$I = \frac{R + R^1}{R^1} i^2 + \frac{L}{R}\frac{di^2}{dt}$$

Arranging the values R R¹ L we have $$I = d i^2 + e\frac{di^2}{dt}$$

Considering Equation 1 it is sufficient to put $r' = i^2$.

Integrating the value of $i^2$ we obtain the value of $r$ to be applied to the controls.

Figure 6:
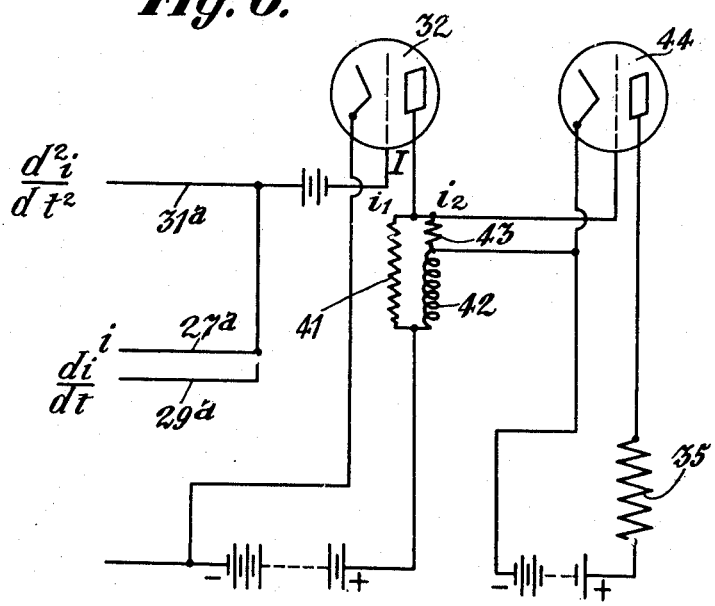
Fig. 6 shows a modification of this arrangement.

Embodiment shown in Fig. 6.

In the plate of the final valve 32 the circuit comprising the resistance R, indicated at 41 in Fig. 6 and the choke LR¹ indicated at 42 is disposed. With the choke there is connected in series a resistance 43 of value $r$, at the terminals of which the tension is $ri^2$, and therefore proportional to $i^2$ This resistance is inserted into the grid circuit of the additional valve 44, in the plate circuit of which is included the field magnet 35 of the motor described above.

The choke L may also be replaced by a condenser of capacity C.

$$I = i^1 + i^2$$

$$\int \frac{i^2 dt}{c} = R^1 i^1$$

$$\frac{i^2}{c} = R^1 \frac{di^1}{dt}$$

$$I - i^1 = cR^1 \frac{di^1}{dt}$$

$$I = i^1 + cR^1 \frac{di^1}{dt}$$

it is sufficient to put $r' = i^1$.

The embodiment will be analogous to the preceding one.

It is obvious that the embodiments described are examples only and that others could be imagined without departing from the scope of the present invention.

Fig. 7 shows a modification of the gyroscopic element, which enables the gyroscope to be rendered independent when the body in motion (for example an airplane) performs complex evolutions vertically. The masses 18 of the ring 16 are replaced by a disc 39 rotatable around the axis A²—B² and carrying an extra load, so that its centre of gravity shall be considerably eccentric. This disc 39 is mounted on ring 16 and carries a winding through which flows an electric current which fixes it magnetically to the ring 16 during normal operation, in such a manner that the assembly 14, 15, 16 shall have, as previously, a period of oscillation around the axis A²—B². This axis A²—B² is supported by a frame 40, which is rotatable with reference to the wheel 13 around the axis A³—B³, which is substantially vertical. During normal operation this frame is fixed with reference to the wheel 13, for example by means of a locking device 41. The apparatus then operates in the manner described above.

If the airplane performs complex evolutions in the vertical direction, it is sufficient to cut off the current from the disc 39 so as to release it, then to release the lock 41. At this moment the spring 17 interposed between the frames 15 and 16 of the universal mounting is rendered inoperative, since the frame 40 is no longer fast with the wheel 13. When the evolutions are terminated the gyroscope is returned into its initial position, if it has deviated therefrom, by displacing the frame 40 by hand so that it shall be located in the plane of the lock 41, the frame 40 being then locked once more.

What I claim as my invention and desire to secure by Letters Patent of the United States is:

1. An apparatus of the class described, comprising a magnetic compass having a dial, a gyroscope having a supporting shaft, a photoelectric cell, means for projecting a beam of light on said cell, means for supporting said cell and light-projecting means for rotation about the axis of the compass dial, means carried by said dial and interposed between the cell and projecting means for variably modifying the intensity of said beam of light, a motor controlled by said cell for rotating the support of the cell and light-projecting means about the axis of said dial in an amount and direction corresponding to the amount and direction of rotation of said dial so that the beam of light will always pass through the same point on the dial, and means actuated by said motor for effecting angular displacements of said gyroscope about the axis of its shaft corresponding to the mean displacements of said dial.

2. An apparatus of the class described, comprising a magnetic compass having a dial, a gyroscope having a supporting shaft, a photoelectric cell, means for projecting a beam of light on said cell, means for supporting said cell and light-projecting means for rotation about the axis of the compass dial, means carried by said dial and interposed between the cell and projecting means for variably modifying the intensity of said beam of light, a motor controlled by said cell for rotating the support of the cell and light-projecting means about the axis of said dial in an amount and direction corresponding to the amount and direction of rotation of said dial so that the beam of light will always pass through the same point on the dial, means actuated by said motor for effecting angular displacements of said gyroscope about the axis of its shaft corresponding to the mean displacements of said dial, and a torsion spring interposed between said gyroscope and its supporting shaft for transmitting rotary motion of said shaft to said gyroscope.

3. An apparatus of the class described, comprising a magnetic compass having a dial, a gyroscope having a supporting shaft, a photoelectric cell, means for projecting a beam of light on said cell, means for supporting said cell and light-projecting means for synchronous rotation about the axis of the compass dial, means carried by said dial and interposed between the cell and projecting means for variably modifying the intensity of said beam of light, a motor controlled by said cell for rotating the support of the cell and light-projecting means about the axis of said dial in an amount and direction corresponding to the amount and direction of rotation of said dial so that the beam of light will always pass through substantially the same point on the dial, means actuated by said motor for effecting angular displacements of the supporting shaft of said gyroscope in an amount corresponding to the mean displacements of said dial, and a spiral spring connecting said gyroscope and its supporting shaft to subject the gyroscope to alternate couples.

4. An apparatus of the class described, comprising a magnetic compass having a dial, a gyroscope having a supporting shaft, a photoelectric cell, means for projecting a beam of light on said cell, means for supporting said cell and light-projecting means for synchronous rotation about the axis of the compass dial, means carried by said dial and interposed between the cell and projecting means for variably modifying the intensity of said beam of light, a motor controlled by said cell for rotating the support of the cell and light-projecting means about the axis of said dial in an amount and direction corresponding to the amount and direction of rotation of said dial so that the beam of light will always pass through substantially the same point on the dial, means actuated by said motor for effecting angular displacements of the supporting shaft of said gyroscope in an amount corresponding to the mean displacements of said dial, a frame carried by the supporting shaft of the gyroscope, a second frame, means for pivotally mounting the second frame for movement about a horizontal axis in the first frame, a third frame, means for mounting the gyroscope for rotation about a horizontal axis in the third frame, and means for mounting the third frame for movement about a vertical axis in the second frame.

5. An apparatus of the class described, comprising a magnetic compass having a dial, a gyroscope having a supporting shaft, a photo-electric cell, means for projecting a beam of light on said cell, means for supporting said cell and light-projecting means for synchronous rotation about the axis of the compass dial, means carried by said dial and interposed between the cell and projecting means for variably modifying the intensity of said beam of light, a motor controlled by said cell for rotating the support of the cell and light-projecting means about the axis of said dial in an amount and direction corresponding to the amount and direction of rotation of said dial so that the beam of light will always pass through substantially the same point on the dial, means actuated by said motor for effecting angular displacements of the supporting shaft of said gyroscope in an amount corresponding to the mean displacements of said dial, a frame carried by the supporting shaft of the gyroscope, a second frame, means for pivotally mounting the second frame for movement about a horizontal axis in the first frame, a third frame, means for mounting the gyroscope for rotation about a horizontal axis in the third frame, means for mounting the third frame for movement about a vertical axis in the second frame, two eccentric masses carried by the second frame for imparting a pendulous effect to the latter, and a damper, consisting of two oil reservoirs communicating through a narrow tube, mounted on said third frame.

JACQUES RATEAU.